W. E. SAWYER & A. MAN.
Regulator for Electric-Lights.
No. 205,305. Patented June 25, 1878.
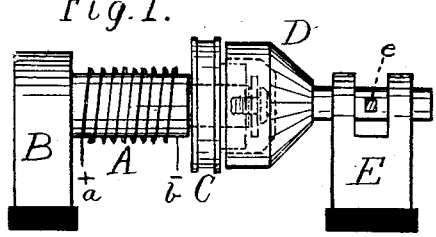
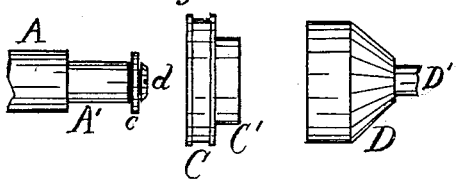
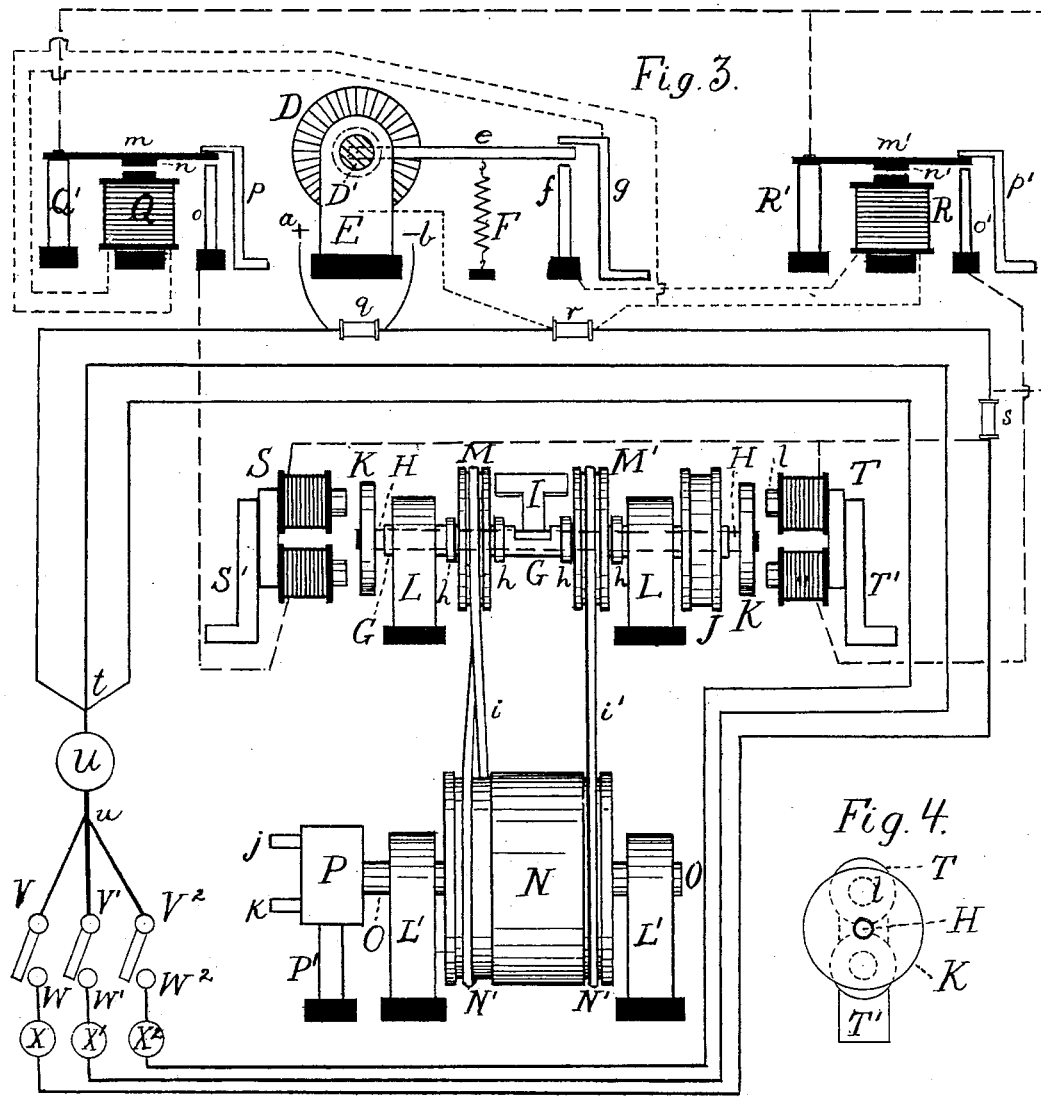
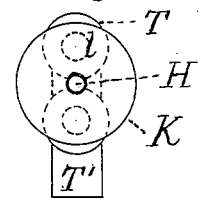
Witnesses:
G. M. Stratton
Wm. H. Church
Inventors:
W. E. Sawyer.
Albon Man

UNITED STATES PATENT OFFICE.

WILLIAM EDWARD SAWYER, OF NEW YORK, AND ALBON MAN, OF BROOK-LYN, N. Y.

IMPROVEMENT IN REGULATORS FOR ELECTRIC LIGHTS.

Specification forming part of Letters Patent No. 205,305, dated June 25, 1878; application filed May 25, 1878.

*To all whom it may concern:*

Be it known that we, WILLIAM EDWARD SAWYER, of the city, county, and State of New York, and ALBON MAN, of the city of Brooklyn, county of Kings, and State of New York, have invented certain new and useful Improvements in Regulators for Electric Lights, of which the following is a full, clear, and exact description.

The objects of our invention are, first, to supply to an electrical circuit or circuits containing electric lamps an absolutely uniform volume of current, in order to obviate the unsteadiness which has characterized most attempts at distribution; second, to supply, automatically, only so much current as may be necessary to meet the demand, thereby insuring the economical and satisfactory operation of a distributing system; and, third, when the demand for the current is lessened or increased by the removal of lamps from or their introduction into the circuit or circuits supplied by the generator, to cut off steam from, or add steam to, the engine driving the generator, in order that there may be no waste of power when the demand for the current calls for a limited application of it merely.

Referring to the drawings accompanying and forming a part of this specification, Figures 1 and 3 are views of our electrical regulator and circuits connected therewith, and Figs. 2 and 4 are separate views of parts thereof.

The regulator of our invention so controls the steam or other power actuating the generator of electricity that this power is increased or diminished as the demand for the current is increased or diminished; and, while we have shown the result as accomplished in one way, we do not confine ourselves to the precise apparatus and the manner of its operation shown and described.

We prefer to place a sensitive magnetic apparatus in the circuit of the generator, which, when a lamp is lighted, so to speak, automatically takes cognizance thereof, and supplies that quantity of steam to the engine which is necessary to drive the generator at that speed which will give the exact required volume of electricity. We may so arrange our apparatus, however, that the regulator shall start different generators or couple different parts of a single generator in circuit, as may be required to supply the current; or we may arrange the regulator to control the current by the automatic changing of resistances. We may, in fact, in many ways, naturally suggestive, vary the application of our invention; and hence we do not limit ourselves to the employment of any special form of apparatus.

Referring to the drawings, Figure 1 is a side view of the primary features of the regulator.

A is a single round iron bar, held in standard B, and provided with a journal, A', also of iron, upon which journal, driven by any power having uniformity of motion, is a pulley, C, also of iron, provided with a flange or hub, C'. The motive-power driving-pulley C we have not deemed it necessary to illustrate, inasmuch as it may be in the form of a clock-work or any power whatever derived from any source whatever, the only requisite being uniformity of motion.

The pulley C is held in place by washer c, secured by screw d entering the end of journal A'. If desired, the journal A' may be provided with a thin bushing of Babbitt or other anti-friction metal; but, as such a bushing is not essential to the practical operation of our invention, we have not shown it in the drawings.

Closing over the flange C', but not touching it, is an iron cap, D, hollowed out, as indicated by the dotted lines, whose shaft D' has its bearings in standard E, in which it is free to turn. In Fig. 2 these several parts are shown disconnected.

The bar A is wound with conducting-wire a b, in the ordinary manner, so as to render the bar an electro-magnet.

Referring to Fig. 3, in which is given a partial end view of the before-described apparatus, e is a metal lever let into shaft D', the extremity of which plays between the two contacts f and g. F is a retractile spring, (or it may be a weight,) capable of any adjustment, by means of which the lever e, when no counter force is exerted, is held in contact with standard $f$. The pulley C is revolved in the direction opposite to that of the retraction of spring F. The speed of its rotation may be anywhere between one hundred and two thousand five hundred revolutions per minute.

The bar A becoming a magnet by reason of the current circulating in the coils $a\ b$, the journal A′, pulley C, and hub C′ also become magnetic, and the tendency of the hub C′ is to attract the cap D in the direction of rotation of the pulley C, and thus to overcome the retractile force of spring F. The spring F is so adjusted that when the required strength of current is supplied by the generator, its retracting effect is exactly balanced by the counter attraction of the revolving magnetic hub C′, and the lever $e$ remains counterpoised between the two contacts $f\ g$, touching neither of them, which is the normal position of the lever.

Referring now to Figs. 3 and 4, G is a hollow shaft, constantly revolving in standards L L, the motive power, of any kind whatever, being applied through the pulley J. Upon the shaft G, held in position by ferrules $h\ h\ h\ h$, are two loose pulleys, M M′, over which pass the belts $i\ i'$ to drum N, provided with grooves N′ N′. Belt $i$ is crossed, and belt $i'$ is run in the ordinary manner. Thus the drum N on shaft O, whose bearings are in standards L′ L′, revolves in one direction or the other, accordingly as pulley M or pulley M′ is actuated by shaft G.

Passing loosely entirely through hollow shaft G is a second shaft, H, upon each end of which is an iron disk, K. The shaft G is slotted near the middle, and through the slot the T-shaped piece I is fixed to the inner shaft H, whereby the inner shaft is caused to rotate with shaft G. The T-shaped piece I serves to impart motion to the loose pulleys M and M′, accordingly as it is drawn to the right or to the left, by the right or left movement of the inner shaft H, and thus caused to impinge upon one pulley or the other. The iron disks K, constantly revolving, constitute the armatures of electro-magnets S and T, fixed to standards S′ and T′. They rotate before the pole ends $l$ of the magnets, and are attracted to the left or to the right, accordingly as magnet S or magnet T is actuated. If to the left, the T-shaped piece I is caused to impinge upon pulley M, and the drum N revolves in one direction. If to the right, the pulley M′ is actuated, and the drum N revolves in the opposite direction.

The shaft O of drum N enters the steam-chest P on standard P′, $j$ and $k$ representing the pipes leading thereinto and therefrom. By the rotation of this shaft steam is let into or cut off from the engine (not shown) which drives the generator U. The valve arrangements for the letting in or cutting off of steam we have not designed to show, the same constituting no part of our invention, and steam-cut-off valves being well-known mechanical devices. We remark, however, that the shaft O may operate upon the valve or valves by means of a screw or lever movement, or rotating or sliding ports.

The apparatus, Fig. 1, being preferably delicate, and the contacts between the lever $e$ and standards $f$ and $g$ correspondingly light, we have thought it best to resort to relay-magnets Q and R to establish the circuits of magnets S and T. The armatures $n$ and $n'$ are fixed to spring-levers $m$ and $m'$, attached to standards Q′ and R′. When no current is circulating in the coils of the magnets Q and R, the levers $m\ m'$ bear against the stop-standards $p\ p'$; but when these magnets are actuated their levers are brought into contact with standards $o\ o'$. The three resistances $q\ r\ s$ serve to divert the required portions of the current from generator U into the several local circuits.

V, V¹, and V² are three switches, whose studs W, W¹, and W² are connected, respectively, with the electric lamps or other apparatus, X, X¹, and X².

The operation of our invention is as follows: The lamp X is put in circuit by switch V, (which, we remark, is not essential, as it and the lamp may both be omitted from this branch,) and the engine (not shown) which drives the generator U being set in motion, a current of electricity is generated in the circuit of the lamp X, indicated by the unbroken line, branching from the generator at the points $t\ u$. In this branch are the three resistances $q\ r\ s$. By means of the resistance $q$ a portion of the current is diverted into the coils $a\ b$ of magnet A, and the speed of rotation of the pulley C being independent of the speed of the engine, and a uniform motion in itself, it follows that if the retractile force of the spring F is adjusted so as to be exactly counterbalanced by the magnetic force of the hub C′ acting upon the paramagnetic cap D, the lever $e$ will remain in a counterpoised position between the two contacts $f\ g$, touching neither of them.

Let it now be assumed that the engine increases its speed, or that from any other cause too much electricity is supplied to the circuit, the magnetic attraction of hub C′ for the cap D overbalances the retractile force of spring F, and the lever $e$, rising, makes connection with contact $g$. The current used through this connection is diverted by resistance $r$, as shown by the dotted lines, the connection of the lever $e$ with contact $g$ causing it to flow from one side of the resistance through the standard E, shaft D′, lever $e$, contact $g$, magnet Q, and thence to the other side of the resistance. The result is that armature-lever $m$ is attracted, contact is made with standard $o$, and the current used through this connection is diverted by resistance $s$, as shown by the broken or dash lines, into magnet S. The disk-armature K of that side is attracted, and, T-piece I impinging upon pulley M, drum N is rotated in one direction, and less steam is supplied to the engine, the effect of which is to drive the generator at a reduced speed, and consequently to supply less current to the circuit.

Assuming, on the other hand, that the engine decreases its speed, or that from any other cause an insufficient volume of electricity is supplied to the circuit of lamp X, the magnetic attraction of hub C' for the cap D is overbalanced by the retractile force of spring F, and lever e, falling, establishes connection with contact f. The result is that magnet R is actuated, lever m' makes contact with standard o', magnet T is actuated, and, T-piece I impinging upon pulley M', that pulley is caused to rotate with shafts G and H; and drum N turning in the direction opposite to that in the first instance, more steam is supplied to the engine, the speed of the generator U is increased, and a greater volume of electricity is supplied to the circuit.

Now let switch $V^1$ be moved upon its stud $W^1$, lamp $X^1$ is put in circuit. The two circuits of lamps X and $X^1$ being of equal resistance, but one-half as much current is now supplied to the coil $a\,b$ as in the first instance; and hence lever e makes connection with contact f, and, through the actions before noted, more steam is supplied to the engine; and the generator U being driven at greater speed, the equipose between the attraction of magnet A and the retraction of spring F is quickly established. The same may be said of the placing of the lamp $X^2$ in circuit, the division of the current lessening its force in the circuit of lamp X, and augmentation immediately following.

When the circuits are parallel circuits, as shown, and the current is divided among them, it may be preferable to arrange the drum N so as to increase the quantity of current supplied, by coupling together several generators or parts of a single generator, rather than to increase the speed of the engine.

When the lamps are arranged in series, so that the current passing into and out of one lamp enters another, and so on, the introduction of a lamp, inasmuch as it increases the resistance of the circuit, and thus renders an increase in the tension of the current necessary, should preferably have the effect of increasing the speed of the generator.

Having thus fully described our invention, what we claim as such, and desire to secure by Letters Patent, is—

1. In an electrical regulator, the combination of two paramagnetic parts, C' and D, operating substantially as set forth.

2. In an electric lighting system, a generator of electricity, two or more electric lamps supplied thereby, and an independent electro-magnetic switch or regulator, energized by the current from the generator, and acting automatically upon the occurence of any change of electrical condition in the circuit or circuits supplied, to allow of a corresponding change in the quantity or intensity of the current generated.

WILLIAM EDWARD SAWYER.
ALBON MAN.

Witnesses:
P. M. STRATTON,
WM. H. CHURCH.